April 26, 1927.
N. A. CHRISTENSEN
COMPRESSOR GOVERNOR
Filed April 18, 1924
1,626,076
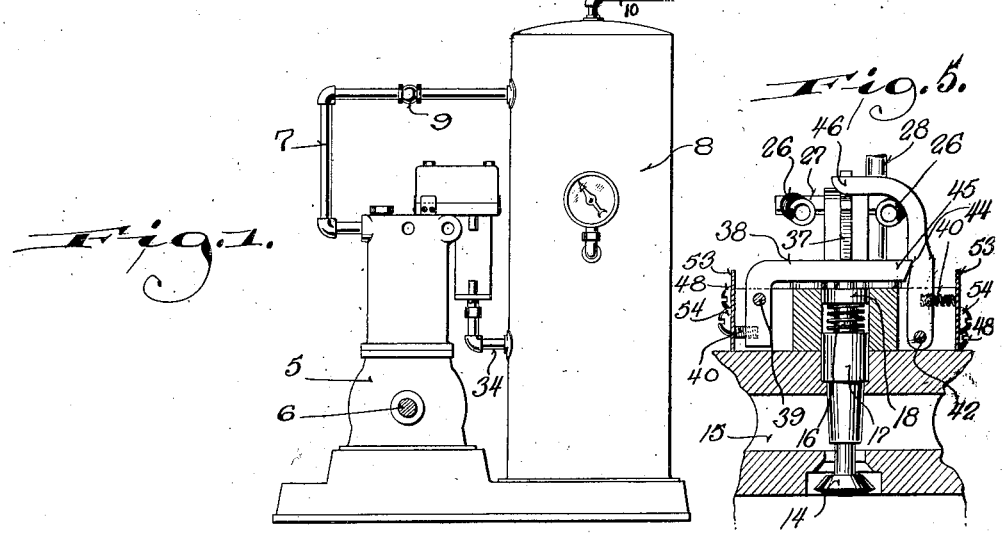
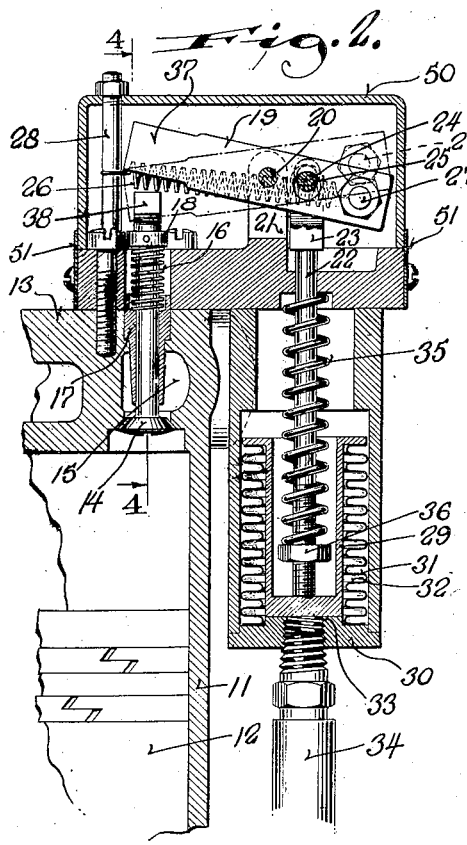
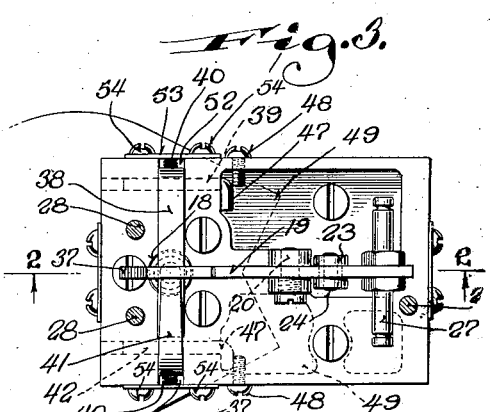
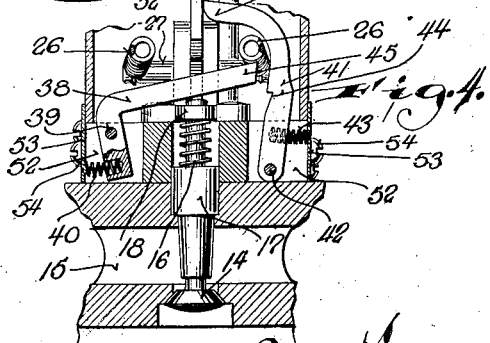
Inventor
Niels A. Christensen
By Quarles & French
Attorneys Patented Apr. 26, 1927.

1,626,076

UNITED STATES PATENT OFFICE.

NIELS A. CHRISTENSEN, OF MILWAUKEE, WISCONSIN.

COMPRESSOR GOVERNOR.

Application filed April 18, 1924. Serial No. 707,536.

The invention relates to compressed air systems, and more particularly to the governor or control of a continuously running compressor.

The object of the invention is to provide a continuously driven compressor with an improved governor or control for preventing the compressor supplying air to the reservoir after a predetermined pressure has been reached therein by providing novel and efficient mechanism which operates to hold the inlet valve open under such conditions, said mechanism being operated and controlled by the pressure of the air in the system or reservoir.

The invention further consists in the several features hereinafter set forth and more particularly defined in the claims at the conclusion hereof.

In the drawings: Fig. 1 is a view of a compressed air system equipped with the governor embodying the invention;

Fig. 2 is a detail sectional view of the governor embodying the invention taken on the line 2—2 of Fig. 3;

Fig. 3 is a plan view of the governor with the top cover removed;

Fig. 4 is a detail sectional view taken on the line 4—4 of Fig. 2;

Fig. 5 is a sectional view similar to Fig. 4, showing the parts in valve-holding position.

In Fig. 1 I have shown a compressed air system embodying a compressor 5 whose shaft 6 is continuously driven, said compressor being provided with the usual discharge valve past which the air is forced through a pipe 7 to a supply tank 8, a check valve 9 being provided in the pipe 7. This supply tank 8 may be used to supply compressed air through a pipe 10 for any useful purpose, but more specifically to furnish air for the starting or brake systems of an automotive vehicle in which instance the compressor is driven through suitable connections with the drive shaft of the propelling motor for such vehicle.

In Fig. 2 I show a portion of the cylinder 11, the piston 12 working therein, the head 13 and the automatic or suction inlet valve 14 of the compressor which is acted upon by the governor to control the output of the compressor.

The inlet valve 14 is here shown as of the poppet type controlling the passage of air from the inlet port 15 into the cylinder 11 and normally urged to a closed position by a spring 16 interposed between the fixed guide bushing 17 for the stem of said valve and a collar 18 pinned or otherwise suitably secured to said stem.

An operating lever or hammer member 19 is pivotally mounted on a pin 20 carried by ears on the governor casing 21 and is operated by a rod 22 which has a forked upper end 23 provided with a pin 24 mounted in hole 25 in said lever, said hole being larger than the pin to provide a lost motion connection so that a pair of springs 26 connected to a pin 27 on said lever beyond the hole 25 and to studs 28 on the casing may produce a quick and powerful throw of said lever relative to the pin 24.

The rod 22 is moved in one direction, that is, upwardly by fluid-pressure-operated means comprising a cap member 29 to which the lower end of said rod is secured and forming with an end plate 30, a sylphon bellows 31, connected at one end to said cap and at its other end to said plate in a fluid-tight manner, a diaphragm or pressure chamber 32 in communication with the reservoir or tank 8 through a port 33 and a pipe 34 leading to said reservoir. Thus, when air is introduced into chamber 32 it will tend to move the cap 29 upward and hence move the rod 22 upward and cause the end of lever 19, with which it is connected, to swing upward past its fulcrum center, and the springs 26 then pull in the opposite direction to cause the lever to move down the amount of the lost motion referred to.

The rod 22 is moved in the opposite direction by a spring 35 interposed between a part of the governor casing and a nut 36 on said rod, which spring causes said rod to move downward in opposition to the pressure of the air in the chamber 32 and this causes the end of lever 19 with which it is connected to swing downward past its fulcrum center, and the springs 26 pulling in the opposite direction cause the lever to move up, as shown in full in Fig. 2, the amount of lost motion referred to. The tension of the spring 35 is adjusted to such a value that it holds the lever 18 in its upper or inoperative position against the pressure in the chamber 32 until the reservoir pressure builds up to a certain predetermined maximum value.

The free end 37 of the lever 19 on its downward swinging movement operates an inlet valve or latch holding lever 38 to move the same down to hold the inlet valve open when the pressure in the reservoir has attained a predetermined maximum value. This lever is in the form of a bell-crank pivotally mounted on a pin 39 and normally moved away from the end of the stem of the inlet valve by a spring 40, said lever being transversely disposed relative to the lever 19 to be engaged thereby and moved down to open said inlet valve.

In order that the inlet valve will not be held open under slight deviations in pressure in the reservoir, a trigger or latch 41 cooperates with the lever 38. This latch 41 is in the form of a lever pivotally mounted at its lower end on a pin 42 and normally moved toward the lever 38 by a spring 43. The lever 41 has a notch 44 with which the pointed free end 45 of the lever 38 engages, whereby said trigger 41 holds the lever 38 in an inlet valve opening position when the lever 19 has moved said lever 38 to this position. Said latch 41 also has a curved or bevelled face 46 at its upper end engaged by the end 37 of the lever 19 on its upward swinging movement so as to release said latch from locking engagement with the lever 38 and thus allow the inlet valve to perform its normal functions.

With the above construction, when the pressure in the reservoir 8, and hence chamber 32, reaches a predetermined maximum value, the diaphragm including the member 29 moves the rod 22 upward and swings the free end 45 of the lever 19 downward, the lever 19 on swinging past its horizontal position being given a quick and strong throw by the springs 26 and coming in contact with the lever 38 and swinging the same down against the end of the inlet valve which then throws this valve open, at which time the trigger or latch 41 engages the lever 38 and keeps it in position to hold the inlet valve open after the lever 19 moves away from the latch or lever 38. Thus, the inlet valve is held in an open position and the piston of the compressor simply draws in and pushes out the air through the inlet port 15 until such time as the pressure in the system has dropped to such a point that there is less force on the diaphragm or member 29, which then permits the spring 43 to come into action and move the lever in the opposite direction, causing the end 47 of said lever 19 to swing upward when the lost motion again comes into play and springs 26 impart a quick and strong force to the lever to move said end of said lever against the upper end of the latch to cause its release of the lever 38 which then moves to a disengaged position under the action of its spring 40 and the inlet valve of the compressor is then free to operate normally and supply atmospheric air to the compressor which then functions normally to supply the tank until the pressure reaches the desired maximum value and then the action of holding the inlet valve open is again repeated. Thus, the movement of said lever 19 by said rod 22 causes said lever to move the lever 38 to hold the inlet valve open or to knock out the latch 41 so that said lever 38 is released and the springs 26 with the lost motion connection above referred to cause the lever to give a quick, powerful, hammer-like blow to the lever 38 in one instance and the latch 41 in the other instance.

It will be noted that the pins 39 and 42 are each fitted into bores in the casing 21 and have hooked or bent ends 47 engaged by screws 48 to hold said pins in position, said pins being inserted into their bores through the recesses 49 in the casing. This mounting for the pins is simple, effective and economical.

The studs 28 also secure the removable cover 50 in place on the casing 21 between the plate guides 51, and the springs 40 and 43 working in slots 52 in the casing bear at their ends against plates 53 secured to the casing by screws 54.

I desire it to be understood that this invention is not to be limited to any particular form or arrangement of parts except in so far as such limitations are included in the claims or made necessary by the prior art.

What I claim as my invention is:

1. In a compressor control, the combination with a compressor and the pressure system supplied thereby, said compressor having a valve controlling passage of air to atmosphere, of a pair of spring-pressed latches engageable with each other to hold said valve open, of hammer means free of said latches and responsive to pressure changes in said system for moving one of said latches to cause their locking engagement to hold said valve open when the pressure in said system rises above the desired maximum value and for moving the other of said latches to release them from valve-holding position when the pressure in the system drops below the desired minimum value.

2. In a compressor control, the combination with a compressor and a pressure system supplied thereby, said compressor having a valve controlling passage to atmosphere, of means for controlling the operation of said valve while the compressor is running comprising an operating member, a valve engaging member moved directly by said operating member to open said valve, a latch engageable with said valve-engaging member to hold it in valve-opening position and directly engaged by said operating lever to release said valve-engaging member, and means responsive to pressure changes in said pressure system for actuating said operating member and causing it to come into quick and powerful contact with said valve-engaging member in one position and with said latch in another position.

3. In a compressor control, the combination with a compressor having a valve controlling passage to atmosphere and the system supplied by the compressor, of means for controlling the operation of said valve comprising a pivoted operating lever, a valve engaging lever actuated by said operating lever, a holding latch for said valve-engaging lever adapted to be released by said operating lever and means responsive to pressure changes in said system to actuate said operating lever including a member actuated by the fluid pressure of the system and having, in its direction of movement, lost motion connection with said operating lever, and spring means to impart a quick throw to said operating lever on its movement past its fulcrum position.

4. In a compressor control, the combination with a compressor having a valve controlling passage to atmosphere and air system supplied by the compressor, of a pair of spring-pressed latches, one of said latches engageable with said valve, the other latch holding said valve-engaging latch in valve-engaging position, an operating member moving between and engageable with said latches in its movement whereby upon its movement in one direction it moves the valve-engaging latch to open said valve and to a latched position to hold said valve open and upon its movement in the opposite direction it moves said second-named latch to release the valve-engaging latch from locking position, and means responsive to pressure changes in the air system for actuating said operating lever.

5. In a compressor control, the combination with a compressor having a valve controlling passage to atmosphere and the system supplied by the compressor, of means for controlling the operation of said valve comprising a pivoted operating lever, a valve-engaging lever actuated directly by said operating lever, a holding latch for said valve-engaging lever adapted to be released by said operating lever, a member actuated in response to pressure changes in said system for moving said operating lever, said member having a lost motion connection with said operating lever at one side of its pivot, and spring means connected with said operating lever at the same side of the pivot as said lost motion connection to provide a quick throw to said lever on its movement past its fulcrum position.

6. In a compressor control, the combination with a compressor and the pressure system supplied thereby, said compressor having a valve controlling passage of air to atmosphere, of a pair of spring-pressed latches engageable with each other to hold said valve open, and latch-controlled means, free of said latches and responsive to pressure changes in said system, for moving one of said latches to cause their locking engagement to hold said valve open when the pressure in said system rises above the desired maximum value and for moving the other of said latches to release the latches from valve-holding position when the pressure in the system drops to the desired minimum value.

7. In a compressor control, the combination with a compressor and the pressure system supplied thereby, said compressor having a valve controlling passage of air to atmosphere, of a pair of spring-pressed latches engageable with each other at pressures below a predetermined minimum value allowing said valve to function as an inlet valve, latch-moving means, and operating means having a lost motion connection with said latch-moving means, said operating means responsive to pressure changes in said system to cause actuation of said latch-moving means to effect the locking engagement of the latches to hold said valve open when the desired maximum pressure has been reached.

In testimony whereof, I affix my signature.

NIELS A. CHRISTENSEN.